(12) United States Patent
Ting

(10) Patent No.: US 7,658,615 B2
(45) Date of Patent: *Feb. 9, 2010

(54) CARD CONNECTOR ASSEMBLY WITH A DAUGHTER BOARD

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/319,080

(22) Filed: Dec. 30, 2008

(65) Prior Publication Data

US 2010/0009573 A1    Jan. 14, 2010

(30) Foreign Application Priority Data

Dec. 31, 2007    (TW) .............................. 96151057 A
Jan. 7, 2008      (TW) .............................. 97100521 A

(51) Int. Cl.
*H01R 12/00*    (2006.01)
(52) U.S. Cl. ...................................... 439/65; 439/541.5
(58) Field of Classification Search .................. 439/65, 439/79, 159, 541.5
See application file for complete search history.

(56) References Cited

U.S. PATENT DOCUMENTS

| | | | |
|---|---|---|---|
| 5,713,747 A | 2/1998 | Hsia | |
| 7,018,222 B2 * | 3/2006 | Chang | 439/159 |
| 7,147,495 B2 * | 12/2006 | Kuo | 439/159 |
| 7,189,088 B2 | 3/2007 | Cheng | |
| 2008/0057754 A1 * | 3/2008 | Ho | 439/79 |
| 2008/0096409 A1 * | 4/2008 | Cheng | 439/159 |
| 2008/0299830 A1 * | 12/2008 | Yu et al. | 439/631 |
| 2009/0093141 A1 * | 4/2009 | Ting | 439/65 |

* cited by examiner

*Primary Examiner*—Tho D Ta
(74) *Attorney, Agent, or Firm*—Andrew C. Cheng; Wei Te Chung; Ming Chieh Chang

(57) ABSTRACT

A card connector (100) mounted on a printed circuit board to connect with an electronic element, includes an insulating housing (50) retaining a plurality of terminals (51), a shell (31) covering on the insulating housing to define a cavity (20) for receiving a card, the cavity defining a first portion (310) and a second portion (311), the first portion having a width greater than that of the second portion along a direction perpendicular to an inserting direction of the card, a void space (34) located at a lateral side of the second portion, and at a front of the first portion, and a mating connector (14) mounted on the printed circuit board and located at the void space for connecting the card connector with the electronic element electrically.

14 Claims, 7 Drawing Sheets

CARD CONNECTOR ASSEMBLY WITH A DAUGHTER BOARD

BACKGROUND OF THE INVENTION

1. Field of the Invention

The present invention relates to a card connector, and particularly to a card connector which includes a connector to connect with a main board electrically.

2. Description of Prior Arts

Memory cards are known in the art and contain intelligence in the form of a memory circuit or other electronic program. Some form of card reader reads the information or memory stored on the card. Memory cards are used in many applications in today's electronic society, including video cameras, smartphones, music players, ATMs, cable television decoders, toys, games, PC adapters and other electronic applications. A typical memory card includes a contact or terminal array for connection through an electrical connector to a card reader system and then to external equipment. The connector readily accommodates insertion and removal of the card to provide quick access to the information and program on the card. The card connector includes terminals for yieldably engaging the contact or terminal array of the card.

Memory card connectors that allow two memory cards to be simultaneously connected to a single memory card are also available in the market. Such a memory card connector usually comprises two connectors, and each connector is capable of receiving one memory card and stacked with the other. Example is disclosed in U.S. Pat. No. 2006/0196781. Such a stacked card connector comprises an upper connector and a lower connector stacked with the upper connector. The upper connector and the lower connector each has an insulating housing. On a rear end of each insulating housing, a pair of fixing holes are defined for screws fastened therein orderly. Thus, the upper connector and the lower connector are mounted with each other to receive a card simultaneously.

However, the screws is only mounted on the rear portion of the stacked card connector, and there is no fastening feature fixed on the former portion thereof. Therefore, when the card connector is in assembly or in operation, the former portion of the card connector will be loosen. As a result, it is possible that the upper connector and the lower connector will move away form each other. Thus, a special fastening feature is needed to assembly the upper one and the lower one together. Thus, a special fastening feature is needed to assembly the upper one and the lower one together.

Therefore, the present invention is directed to solving the problem by providing a card connector which has a mini structure.

SUMMARY OF THE INVENTION

An object, therefore, of the invention is to provide a card connector capable of saving more space on a main board and avoiding an interference to terminals from external device.

In the exemplary embodiment of the invention, a card connector mounted on a printed circuit board to connect with an electronic element, includes an insulating housing retaining a plurality of terminals, a shell covering on the insulating housing to define a cavity for receiving a card, the cavity defining a first portion and a second portion, the first portion having a width greater than that of the second portion along a direction perpendicular to an inserting direction of the card, a void space located at a lateral side of the second portion, and at a front of the first portion, and a mating connector mounted on the printed circuit board and located at the void space for connecting the card connector with the electronic element electrically.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
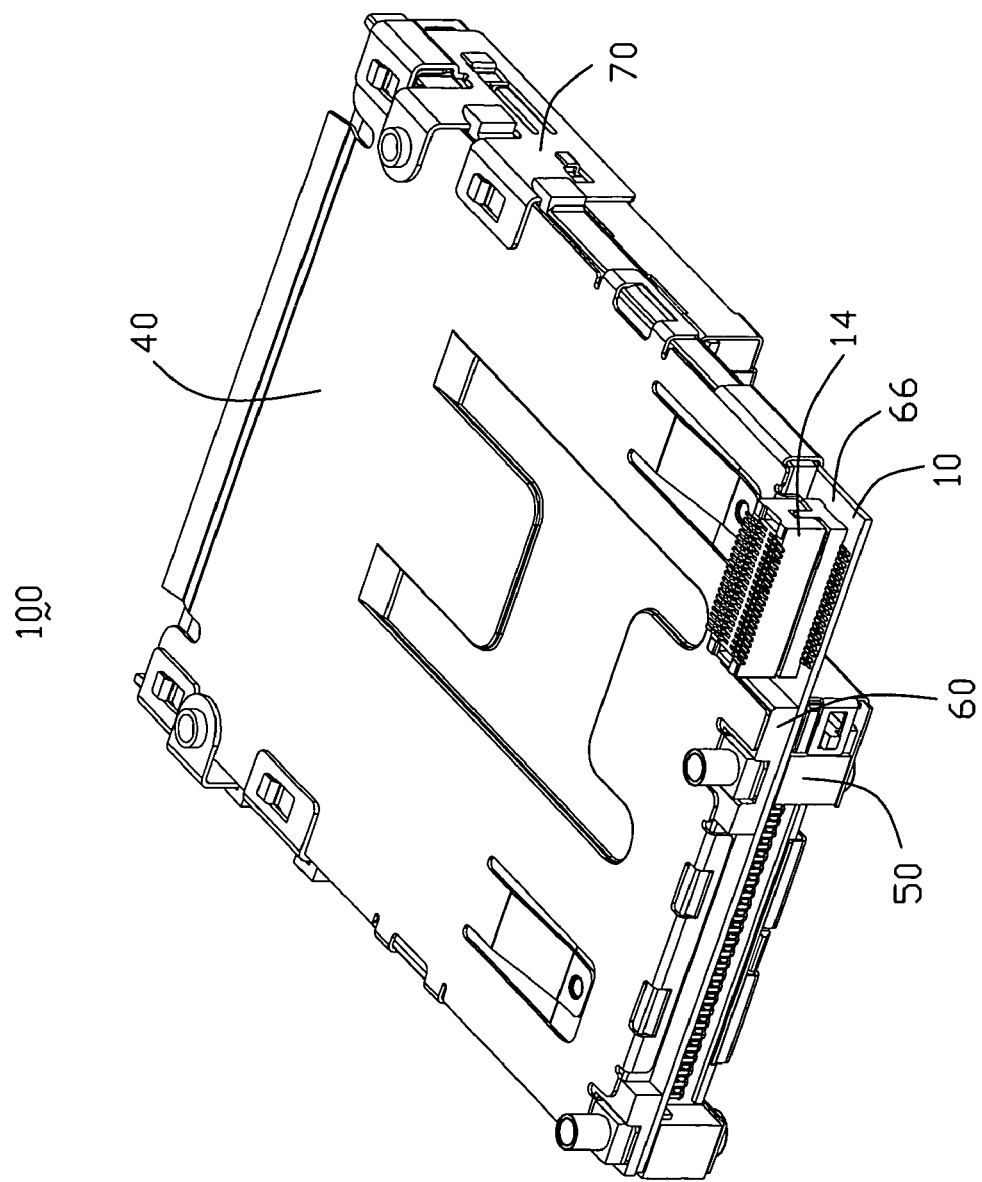
FIG. 1 is a perspective view of a card connector of present invention.

Referring to FIG. 1 to FIG. 7, the present invention provides a card connector 100 comprising a first connector 30 defining a first cavity 20 for accommodating a first card (not shown), a second connector 40 defining a second cavity 80 for accommodating a second card (not shown), a printed circuit board 10 sandwiched by the first connector 30 and the second connector 40, and a female connector 14, for example, a BTB, FPC, FFC, or other cable styles, constituted a third connector 14 in present invention, for connecting the card connector 100 with an electronic element (not shown), such as a maim board electrically. The first card and the second card are different from each other, such as Express card and Smart card, respectively. In this embodiment, the first connector 30 is different from the second connector 40, however they can be the same feature as well to receive the same card. The printed circuit board 10 is provided with a pair of bolt holes 11 for bolts 33, 43 passing through and a pair of holes 12.

Figure 3:
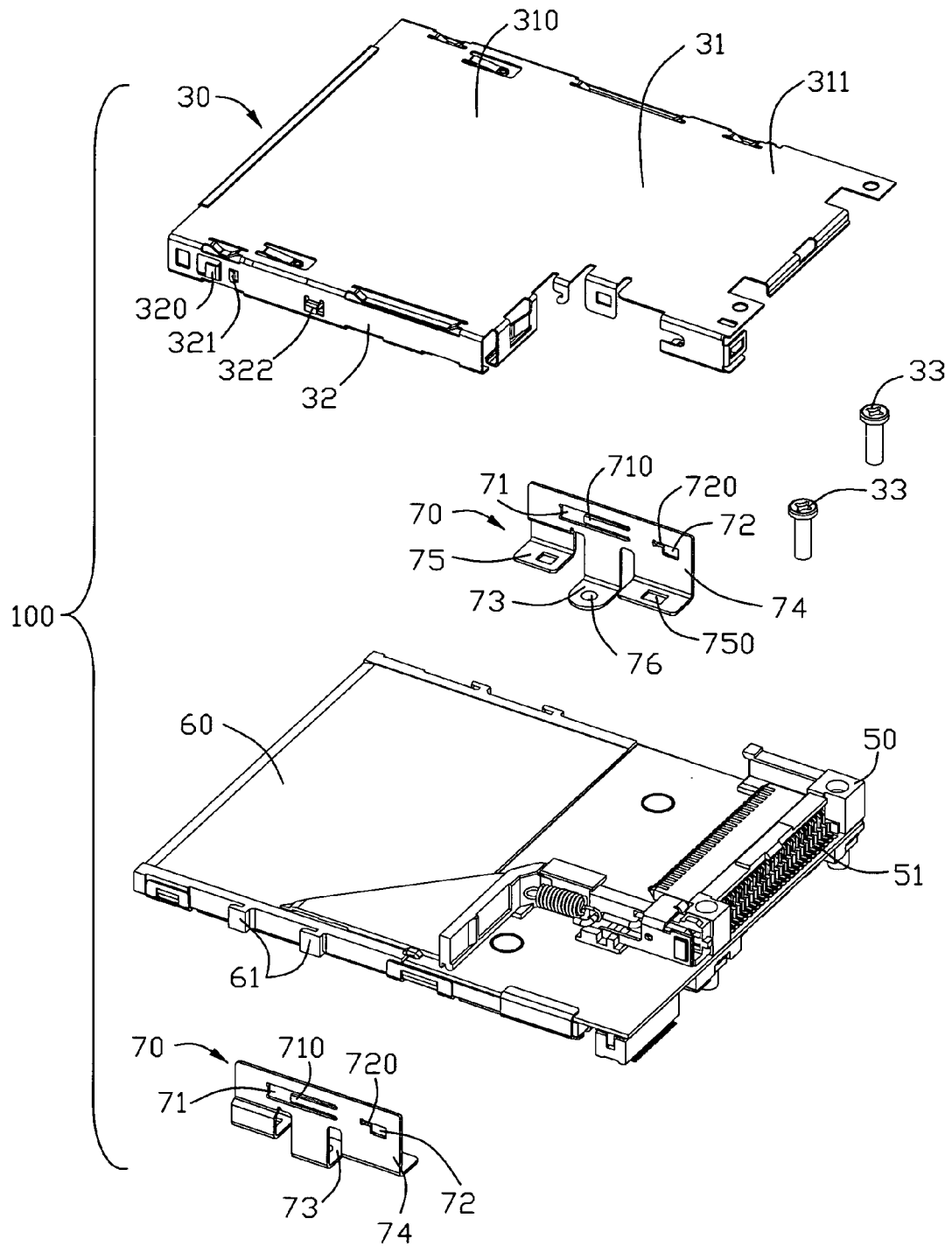
FIG. 3 is a perspective view of a first shell and a pair of stand off of the card connector removed from the card connector of present invention.

Together with FIG. 3 and FIG. 4, the structure of the first connector 30 and the second connector 40 will be described curtly because they have been known as published.

Figure 2:
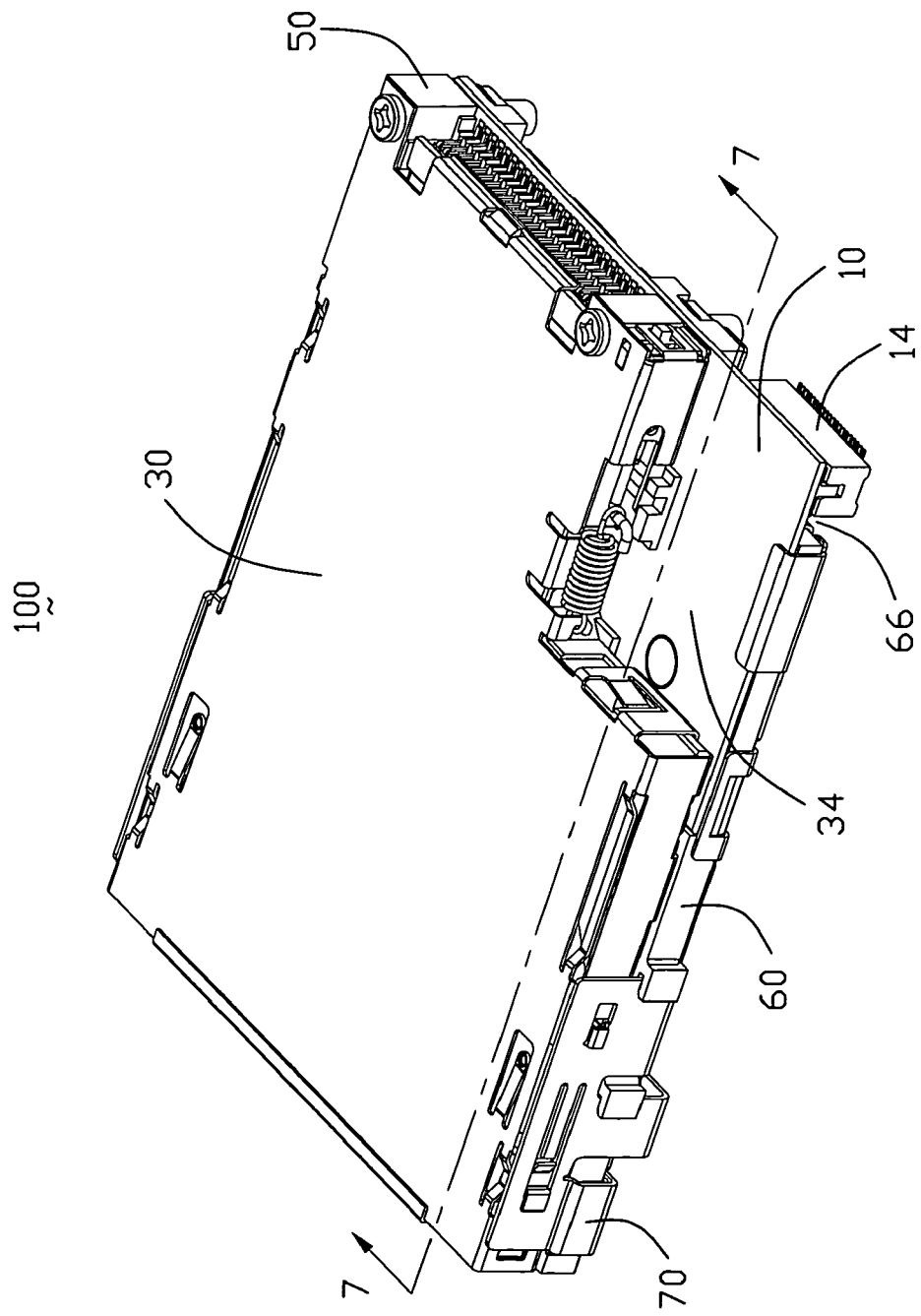
FIG. 2 is a perspective view of the card connector of present invention as shown in FIG. 1 in another aspect.

The first connector 30 comprises a first shell 31 and a first insulating housing 50 covered by the first shell 31. The first insulating housing 50 receives a plurality of first terminals 51 to engage with the first card and mounted on one side of the printed circuit board 10 with the first terminals 51 set thereon in a line. The first shell 31 is of an L shape and defines a first portion 310 with a card entrance and a second portion 311 locking with the first insulating housing 50. The first portion 310 has a width greater than that of the second portion 311 along a transverse direction perpendicular to an inserting direction of the first or second card. Therefore, the first cavity 20 is defined of an L shape to selectively receive an L-shape card or a rectangular shape card. Correspondingly, a first void space 34 is produced at a lateral side of the second portion 311, and at a front of the first portion 310, as shown in FIG. 2 and FIG. 3. The width of the printed circuit board 10 is approximately corresponding to the width of first portion 310, so the printed circuit board 10 partially protrudes into the first void space 34. In a top view, the first connector combining with the printed circuit board 10 is approximately of a rectangular shape. The wider portion 310 comprises a pair of lateral walls 32, and each later wall 32 has a first locking piece 320 extending forwardly, a second locking piece 321 extending backwardly, and a third locking piece 322 extending downwardly therefrom.

Figure 4:
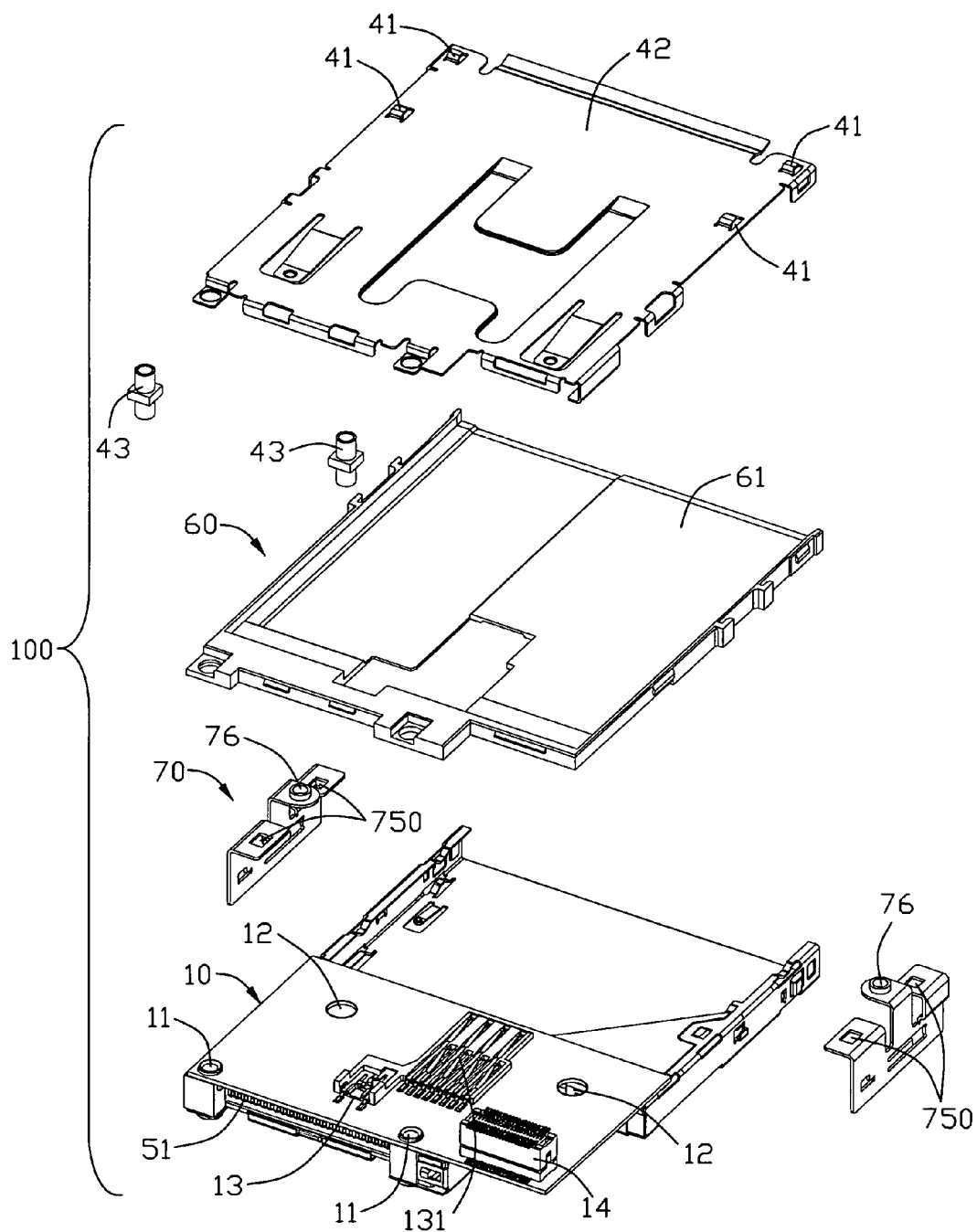
FIG. 4 is a perspective view of a second shell, a second insulating housing and the stand off removed from the card connector of present invention.
Figure 5:
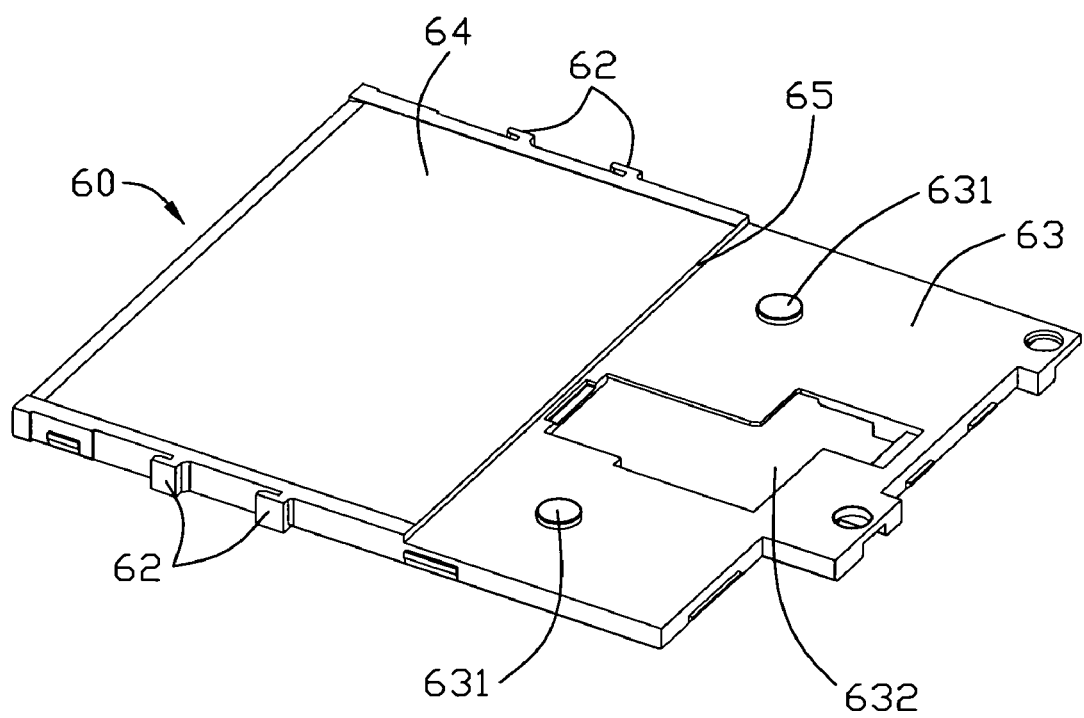
FIG. 5 is a perspective view of the second insulating housing in another aspect respect to the view shown in FIG. 4.
Figure 6:
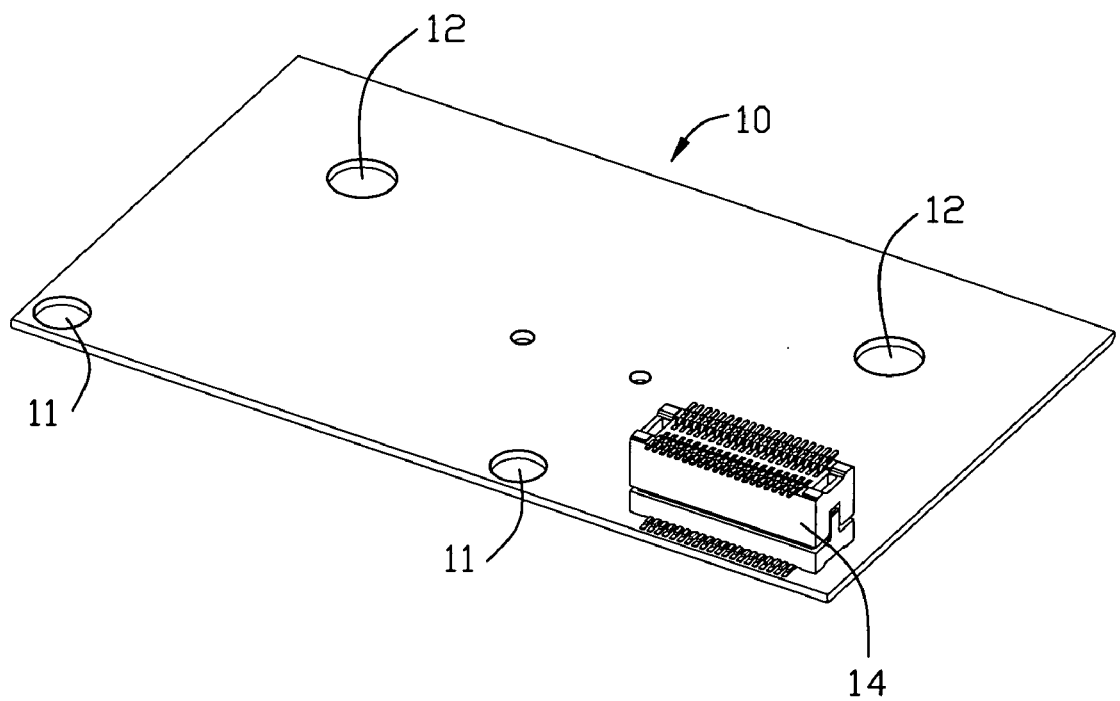
FIG. 6 is a perspective view of a circuit board of present invention with a mating connector mounted thereon.
Figure 7:
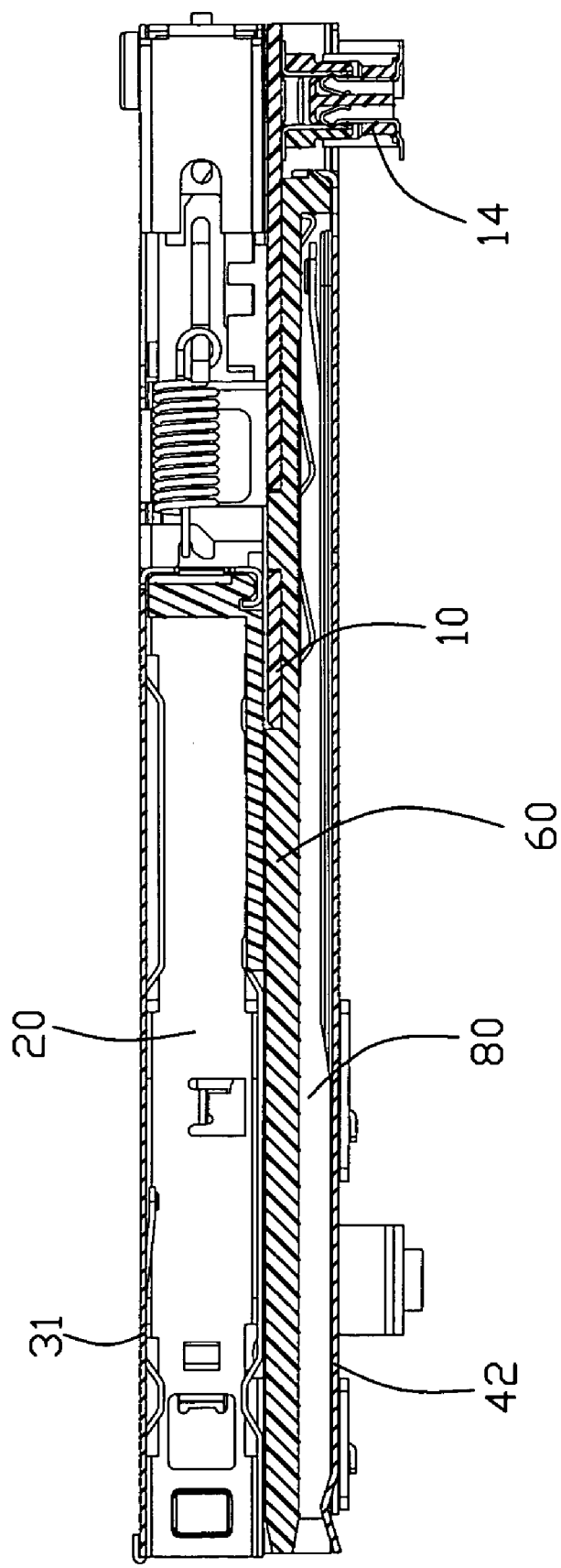
FIG. 7 is a cross section view of the card connector of present invention in FIG. 2 taken along line 7-7.

As shown in FIG. 4 and FIG. 5, the second connector 40 comprises a second shell 42, a second insulating housing 60 covered by the second shell 42, and a terminal module 13 mounted on the printing printed circuit board 10 directly. The terminal module 13 accommodates a plurality of second terminals 131 to electrically engage with the second card. The second insulating housing 60 mainly has two faces, and a first face 61 opposite to the second shell 42 for supporting the second card remove, a second face (not labeled) back to back the first face 61 to lock with the printed circuit board 10. The second face is structured of an upper portion 64 and a lower portion 63, both of them are divided by a step 65. The lower portion 63 is designed to receive the printed circuit board 10. Particularly, the lower portion 63 combining with the printed circuit board 10 has a height equal to that of the upper portion 64. It is to say that when the printing printed circuit board 10 is mounted on the lower portion 63, the upper portion 64 has a surface which is located in a same level or face with an external surface of the printed circuit board 10. So, there is no any interference in the first cavity 20 for the first card remove. Besides, the lower portion 63 comprises a pair of posts 631 to be placed in the holes 12 of the printed circuit board 10, and a receiving hole 632 to couple to the terminal module 13. The second shell 42 comprises a main body (not labeled) covering the second insulating housing 60 and two pairs of clasps 41 on the main body. Each clasp 41 defines an extending direction which is the same as the direction of other clasps. At a back corner of the second connector, a second void space 66 is defined, as shown in FIG. 1. The printed circuit board 10 partially protrudes into the second void space 66. As a result, the overall shape of the second connector 40 is approximately of a rectangular type by combining with the printed circuit board in a top view. As shown in FIG. 1 and FIG. 2, the first void space 34 and the second void space 66 are separated by the printed circuit board 10 at opposite sides thereof.

When the first connector 30 and the second connector 40 are mounted together, the first insulating housing 50 and the terminal module 13 are set to the opposite surfaces of the printed circuit board 10 directly, together with the first terminals 51 and the second terminals 131 soldered on the opposite surfaces of the printed circuit board 10 electrically. Such terminals arranging manner can provide more room for terminals and avoid a high density of terminals on a same face of the printed circuit board 10, achieving a simple and efficient soldering procedure.

To fasten the first connector 30 and the second connector 40 together more firmly, there are a pair of stand off 70 locking with the first shell 31 and the second shell 42. The entire height of the stand off 70 is designed in requirement according to that of the third connector 14 and the card connector 100, in order to make a proper room between the card connector 100 and the main board to set other device or without any room therebetween to reduce the entire height. Each stand off 70 comprises a fixing plate 74 and a standing portion 73 with a mounting hole 76. The standing portion 73 extends downwardly from the fixing plate 74 to engage with the main board. The fixing plate 74 comprises a first hole 72 with a gap 720, a second hole 71 with an elastic piece 710 protruding therein, and a pair of mounting plates 75 extending inwardly from the fixing plate 74. The first shell 31 and the second shell 42 are locked with the stand off 70 in such manner that the first locking piece 320 of the first shell 31 protruding into the second hole 71 properly with the second locking piece 321 collide with the elastic piece 710 rightly to escape from a sidewardly remove, the third piece 322 passes though the first hole 72 and slide in the gap 720 to escape from an upwardly or downwardly remove. Each mounting plate 75 has a locking hole 750 to fasten with the clasp 41 of the second shell 42. Furthermore, each fixing plate 74 is pressed by the pair of clips 62 of the second insulating housing 60 achieving a more table structure.

The mating connector 14 receives a plurality of mating terminals (not labeled) to connect with the first terminals 51 and the second connector 131 electrically, and the mating terminals are arranged in a direction perpendicular to the inserting direction of the card.

In this embodiment, the mating connector 14 is mounted on the second void space 66 to connect the card connector 100 with the electronic device electrically. In other embodiment, the mating connector 14 also can be set on the first void space 34. With such manner, the mating connector 14 is mounted on the printed circuit board 10 without increasing the overall length of the card connector 100. Furthermore, it is unnecessary for the first terminals 51 and the second terminals 131 to extend a long distance to engage with the printed circuit board 10, only soldered on the circuit board 10 directly, and no external device capable of interfering them. In present invention, the mating connector 14 is mounted on the printed circuit board 10 which is sandwiched by the first connector 30 and the second connector 40. In a preferable embodiment, the mating connector 14 is located on the printed circuit board 10 at the first void space 34, then the printed circuit board 10 at the first void space 34 has a great thickness by associating with the second connector as shown in FIG. 2. When the printed circuit board 10 is forcibly pressed to make the mating connector mate with a connector assembly which is mounted on a main board in advance, the printed circuit board is more firm to endure the pressure. Essentially, the mating connector 14 can be used in either the first connector or the second connector which has the first void space 34 or the second void space 66 and is mounted on the printed circuit board as described above to place the mating connector 14.

With regard to FIG. 8, a second embodiment of present invention is shown, designated as a second card connector hereinafter. The second card connector has substantially simple structure as the card connector described above, except that the second card connector has an ejecting mechanism 20 disposed at a lateral side thereof to remove a card. The ejecting mechanism 20 is operated by pushing a bar thereof, different from the ejecting mechanism of the card connector which is operated by pushing a card.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector mounted on a printed circuit board to connect with an electronic element, comprising:
   a first connector comprising:
   an insulating housing retaining a plurality of first terminals;

a shell covering on the insulating housing to define a cavity for receiving a card, the cavity defining a first portion and a second portion, the first portion having a width greater than that of the second portion along a direction perpendicular to an inserting direction of the card;

a void space located at a lateral side of the second portion, and at a front of the first portion;

a mating connector located at the void space electrically connecting to the first connector; and a second connector stackedly arranged with the first connector.

2. The card connector as claimed in claim 1, wherein the mating connector receives a plurality of mating terminals to connect with the first terminals electrically, and the mating terminals are arranged in a direction perpendicular to the inserting direction of the card.

3. The card connector as claimed in claim 1, wherein the mating connector electrically connects to the second connector.

4. The card connector as claimed in claim 1, wherein the second connector comprises a second insulative housing with a plurality of second terminals received therein.

5. The card connector as claimed in claim 4, wherein the mating connector comprises a first plurality of mating terminals electrically connecting to the first terminals of the first connector, and a second plurality of mating terminals electrically connecting to the second terminals of the second connector.

6. The card connector as claimed in claim 1, wherein the second connector has a second insulating housing, and the insulating housing and the second insulating housing are mounted on opposite sides of the printed circuit board directly.

7. The card connector as claimed in claim 6, wherein the second insulating housing comprises a first face and a second face opposite to the cavity, and the second face comprises an upper portion and a lower portion receiving the printed circuit board.

8. The card connector as claimed in claim 7, wherein the lower portion combining with the circuit board has a height approximately equal to the height of the upper portion.

9. The card connector as claimed in claim 8, wherein the lower portion comprises a pair of posts, and the circuit board comprises a pair of position holes in alignment with the posts.

10. The card connector as claimed in claim 1, further comprising a first shell mounted on the insulating housing, a second shell mounted on the second insulating housing, and a stand off is provided to lock with shell and the second shell in common.

11. The card connector as claimed in claim 10, wherein the second shell has a main plate covering the second insulating housing and comprising a clasp, and the stand off has a mounting plate extending inwardly and defining with a locking hole coupling to the clasp.

12. The card connector as claimed in claim 11, wherein the first shell comprises a side wall extending downwardly therefrom, and the side wall comprises a first locking piece extending forwardly, a second locking piece extending backwardly, and a mating piece extending downwardly, and the stand off comprises a first hole receiving the mating piece, and a second hole with an elastic piece protruding therein, and the first locking piece is retained in the second hole, the second locking piece collide with the elastic piece.

13. A card connector assembly comprising:

first and second card connector units cooperating with each other to sandwich a daughter board therebetween in a vertical direction, the first card connector unit defining a cutout at a corner; and a mating connector mounted upon the daughter board and located in said cutout for mating with a complementary connector which is mounted to a mother board on which the first card connector unit is mounted; wherein at least one of said first card connector unit and said second card connector unit have contacts directly mechanically and electrically connected to the daughter board for electrically connected to the mother board through said mating connector.

14. An electrical connector assembly comprising:

a mother board;

an electrical connector sub-assembly mounted upon the mother board;

said connector sub-assembly defining a cutout at a corner with a mating connector disposed therein under a condition that the mating connector is mounted upon a daughter board to which contacts of the connector sub-assembly are mechanically and electrically connected thereto; wherein the mating connector is mated with a complementary connector mounted upon the mother board.

* * * * *